Patented Feb. 23, 1937

2,071,987

UNITED STATES PATENT OFFICE 2,071,987

SILICIC ACID GELS

Earl S. Ridler, Shaker Heights, Ohio, assignor, by mesne assignments, to E. I. du Pont de Nemours & Company, Wilmington, Del., a corporation of Delaware No Drawing. Application December 1, 1933, Serial No. 700,622

3 Claims. (Cl. 23—182)

The present invention relates to silicic acid gels in the form of large unitary particles characterized by a spongy structure in which the pores or voids are of two types, namely of ultramicroscopic and of macroscopic size; in processes of making these gels and in their use in the catalysis of gas phase reactions.

In its broadest embodiment the process of making my new porous gels consists in first preparing a silicic acid hydrogel. An alkaline earth metal carbonate is then mixed with this hydrogel and thoroughly distributed throughout the body of said hydrogel. The wet mass is then broken up or shaped, if desired, and dried. The material is then treated with dilute acid whereby the calcium or other alkaline earth metal carbonate is dissolved and is leached out, leaving a skeleton of substantially pure silica which contains pores instead of the carbonate which was originally incorporated into the silicic acid gel. The acid treated product constitutes my novel porous gel and is ready for use as such or as a carrier for active catalytic material.

These novel gels are distinguished from previously produced silicic acid gels in several important physical characteristics.

When attempting to prepare shaped forms of silicic acid gels without the alkaline earth metal carbonate, it was found that the shaped forms break down on the subsequent drying and impregnating operations into very small pieces passing, for instance, through a 10 mesh screen, whereas my novel porous gel completely maintains its form in these operations.

The apparent density of my acid treated and dried material is much lower than that of a dried silicic acid gel and is about 0.5 to 0.6. Its capacity for absorbing liquid water at ordinary temperature is very high and is usually not less than 120%.

Examined under the microscope, my novel gels appear like a section of a sponge, meaning by that that it shows irregularly shaped, more or less connected solid material separated by voids of similar size and form. The solid material appearing under the microscope ranges in size between about 70 to 250 microns with the voids of about the same magnitude.

Silicic acid gels prepared and dried in a manner similar to the preparation of my porous gels but omitting the incorporation of an alkaline earth metal carbonate and its subsequent removal gives a different picture: they appear massive, glassy with very little space unoccupied by solid material, I believe that the phenomena taking place in the formation of my novel gels are as follows: the silicic acid gel, which surrounds the calcium carbonate particles, is present in relatively thin films and on drying shrink in a substantially uniform manner without setting up any strains.

On cooling the pieces of gel mixed with the carbonate retain their original form and after removal of the carbonate they are physically strong and rugged and cannot be broken up by ordinary chemical means.

When a compact silicic acid gel is dried, considerable strains develop due to the irregular heat transfer and evaporation of water throughout the compact mass of the gel lumps or chunks and on subsequent cooling the particles break up. It has, therefore, been the practice to grind the dried silicic acid gel and form it into pellets, worms or other shapes, by means of binding agents. Carriers made in this manner break up very easily both physically and by chemical means when the active catalyst, such as platinum or vanadium, etc. is recovered therefrom. The carriers made in this old manner constitute agglomerates of individual small silicic acid gel particles.

Careful examination of the individual pieces of porous gel obtained according to my invention from the broken up mixture of wet gel and carbonate and after drying and elimination of the carbonate filler, show that they are of unitary structure, by which term I mean that the silicic acid therein forms a homogeneous, continuous skeleton whereby each piece of porous gel represents a single discrete particle, in contradistinction to pieces of gel formed of small particles agglomerated and held together by a binding agent.

The unitary structure of my porous silica gel pieces can easily be shown by tests. I can, for instance, treat my gel masses with agents which do not attack silicic acid, for instance, boiling with dilute hydrochloric acid and find that the pieces retain their form and shape, whereas agglomerated masses of ordinary silicic acid gel disintegrate into the individual small particles from which they were formed.

One advantage of this structure is that carriers made in my novel manner can be recovered from spent catalysts and can be re-impregnated and used over again.

Besides these advantages of ruggedness and recoverability of the spongy, porous gels made according to my invention, they are much better adapted for impregnation and distribution of the active catalyst and in general catalytic masses prepared from my novel carriers show greater activity and longer life than catalytic masses prepared from agglomerated silicic acid gel particles.

In a comparative series of tests I found, for instance, that a vanadium contact mass prepared with compact silicic acid gel have a maximum conversion efficiency of $SO_2$ to $SO_3$ in an 8% burner gas of 95 to 95.5% at temperatures of 540 to 560° C., whereas a mass of the same vanadium content, prepared with my novel spongy silicic acid gel, produced with the same gas at the same space velocity, a maximum efficiency of 98.5% at a temperature of 430 to 440° C.

I believe that this improvement in the activity of the catalyst is due to the peculiar physical structure of the catalyst carrier which combines the ultramicroscopic porosity inherent in the silicic acid gel with much wider, macroscopic pores, whereby the active substance is distributed over a much larger surface than in compact gel particles.

In the following I give a detailed example of preparing a preferred porous gel according to my invention.

900 parts by weight of a sodium silicate solution of 1.115 specific gravity at 20° C. and containing $SiO_2$ and $Na_2O$ in the ratio of 3.25 to 1 were added to 328 parts by weight of dilute hydrochloric acid, 7.6%, until all the alkali of the silicate solution had been neutralized. The resulting hydrosol had a pH value between 7.6 and 6.8. After the hydrogel had set the reaction product was placed without washing in a ball mill with 1500 parts of water, and 30 parts by weight of finely divided calcium carbonate, or whiting, which passed through a 400 mesh screen, added. The mixture was then ball milled for 20 minutes to distribute uniformly the calcium carbonate throughout the gel. A rather thick slurry of buttermilk consistency was obtained. This was taken from the mill and the excess water removed on a suction filter. The damp cake containing the silicic acid hydrogel, calcium carbonate, the salts of neutralization and excess water was then extruded under hydraulic pressure into rods, or worms, about 1" long and ⅜" in diameter and dried at about 105 to 110° C.

The silicic acid hydrogel, which was disrupted through the ball milling operation, flows together or coalesces during the extrusion and drying operations so that each rod, or worm, forms a unitary particle. The worms shrink during the drying operation to a length of about ¾" and a diameter of 1/16". The dried rods were placed in a convenient container and covered with a dilute solution of hydrochloric acid. The calcium carbonate was soon decomposed and the excess acid and the salts removed by careful washing with water. The rods of pure silicic acid maintained their original dried shape and after drying, if desired, were ready for impregnation with the active catalytic material.

It will be understood that the specific concentration of sodium silicate solution or its composition as given in this example are not limiting factors for my invention. Any hydrogel obtained by the setting of a silicic acid hydrosol will on drying produce a gel with ultramicroscopic pores and any hydrogel produced in this manner will be suitable for the production of a spongy, porous silicic acid containing both ultramicroscopic and macroscopic pores.

Barium carbonate, strontium carbonate or magnesium carbonate can replace the calcium carbonate in the above example or other acids used to extract the carbonate from the shaped, dried porous gel. It will be understood that sulfuric acid or other acid forming insoluble alkaline earth metal salts would not be suitable for the treatment of the dried gel but any water soluble acid, forming a water soluble salt with calcium, barium, etc., could be used.

The calcium carbonate used in the above example represents about 40-50% of the weight of the dry gel obtained from the silicate solution specified. This amount is not particularly critical and amounts from about 20% to about the weight of the silica gel will likewise produce sponge-like, active silicic acid gels. Similarly the particle size of the calcium carbonate as used in the above example is not critical. A carbonate composed of large lumps or granules which would approach the size of the carrier particles to be made would naturally be unsuitable, but carbonates up to about 50 mesh could be used. This indifference to the amount of filler and the size of its particles is, I believe, due to the fact that on drying the silicic acid gel shrinks and the voids formed are much larger than the filler particles originally contained therein. When the wet mixture contains a large amount of carbonate, in number of particles or in their size, there will be less shrinkage than when the mixture contains less particles or small ones but the product after the elimination of the carbonate filler will be quite comparable.

The physical ruggedness and chemical resistance of my gels makes them adaptable as carriers for impregnation with an active catalytic agent by any of the well known methods.

I can, therefore, treat my novel gels with neutral, acid or alkaline solutions of any metal salt or combination of metal salts whereby a metal or metallic compound is deposited upon the carrier.

My novel porous, unitary silicic acid gel particles are likewise useful as adsorbents for gases in the same manner as other silicic acid gels and their use for such purposes is contemplated in my invention.

My novel silicic acid particles are particularly useful as carriers for vanadium compounds or platinum for the conversion of $SO_2$ into $SO_3$ but they can be used in other gas phase oxidizing or reducing operations when impregnated with the required active catalyst.

They can also be used in dehydration and condensations reactions, such as formation of olefines from alcohols or condensation of alcohols with ammonia or amines both as such or when impregnated with aluminum oxide or other base metal oxides.

The extrusion of the hydrogel mixed with an alkaline earth metal carbonate is an exceedingly convenient method of producing shaped forms of porous unitary silicic acid gel particles but there are many other possibilities of producing large particles from the hydrogel which are suitable for use as catalysts or catalyst carriers. When the hydrogel is broken up, then dried and the carbonate subsequently extracted therefrom I obtain in every case unitary particles of spongy silicic acid gel which contains both ultramicroscopic and macroscopic pores.

I claim:

1. In a process of producing unitary particles of porous silicic acid gel the steps of forming a silicic acid hydrosol, setting this sol to a hydrogel, mixing this hydrogel with a finely divided alkaline earth metal carbonate, breaking up the mixture into individual particles, drying said particles and extracting the alkaline earth metal carbonate therefrom by means of an acid which forms a water soluble salt with said alkaline earth metal carbonate.

2. In a process of producing unitary particles of porous silicic acid gel the steps of reacting with an acid upon a sodium silicate solution to form a hydrosol, allowing said hydrosol to set to a hydrogel, mixing said hydrogel with finely divided calcium carbonate, breaking up the mixture into individual particles, drying said particles, and treating said particles with dilute hydrochloric acid to extract the calcum carbonate therefrom.

3. In a process of producing unitary particles of porous silicic acid gel the steps of reacting with hydrochloric acid upon a sodium silicate solution of a $SiO_2:Na_2O$ ratio of 3.25:1 and a specific gravity of about 1.115 to form a hydrosol of a pH between 7.6 and 6.8, setting said hydrosol to a hydrogel, mixing with said gel finely divided calcium carbonate in an amount between 40 and 50% of the dry silicic acid contained in said gel, extruding said mixture to form individual particles, drying said particles at about 105 to 110° C., treating said dried individual particles with dilute hydrochloric acid and washing said particles free from water soluble salts.

EARL S. RIDLER.